United States Patent [19]

Lampe et al.

[11] Patent Number: 4,738,303

[45] Date of Patent: Apr. 19, 1988

[54] ZONE STORAGE HEAT EXCHANGER

[75] Inventors: W. Dean Lampe; John G. Cherng, both of Omaha, Nebr.

[73] Assignee: InterNorth, Inc., Omaha, Nebr.

[21] Appl. No.: 854,911

[22] Filed: Apr. 23, 1986

[51] Int. Cl.⁴ .............................................. F28D 21/00
[52] U.S. Cl. ...................................... 165/10; 126/400; 165/104.11
[58] Field of Search ............................ 165/10, 104.11; 126/400

[56] References Cited

FOREIGN PATENT DOCUMENTS 154126 2/1982 Fed. Rep. of Germany ........ 165/10
857656 8/1981 U.S.S.R. ............................... 165/10

Primary Examiner—Albert W. Davis, Jr.
Attorney, Agent, or Firm—Zarley, McKee, Thomte, Voorhees & Sease

[57] ABSTRACT

This invention is a zone storage heat exchanger. In its most basic terms, the heat exchanger is comprised of a main body filled with an energy storage material. There is disposed within the main body a heat transfer fluid annulus for flow of the heat transfer fluid therethrough. The annulus has a hollow inner portion which is filled with an energy storage material.

3 Claims, 3 Drawing Sheets

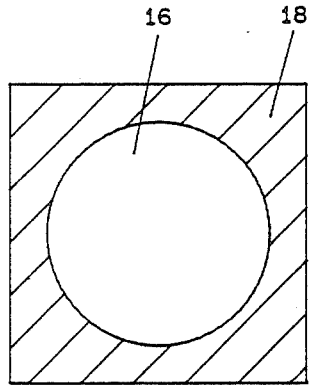
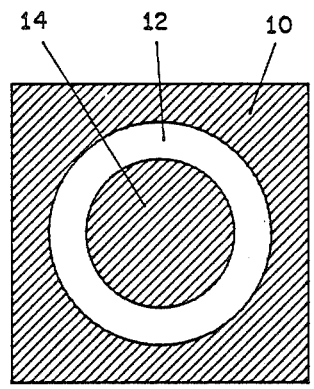
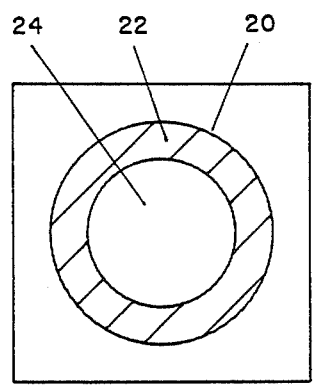
▨ ENERGY STORAGE MATERIAL
FIG. 1B
PRIOR ART
▨ ENERGY STORAGE MATERIAL
FIG. 1A
▨ ENERGY STORAGE MATERIAL
FIG. 1C
PRIOR ART
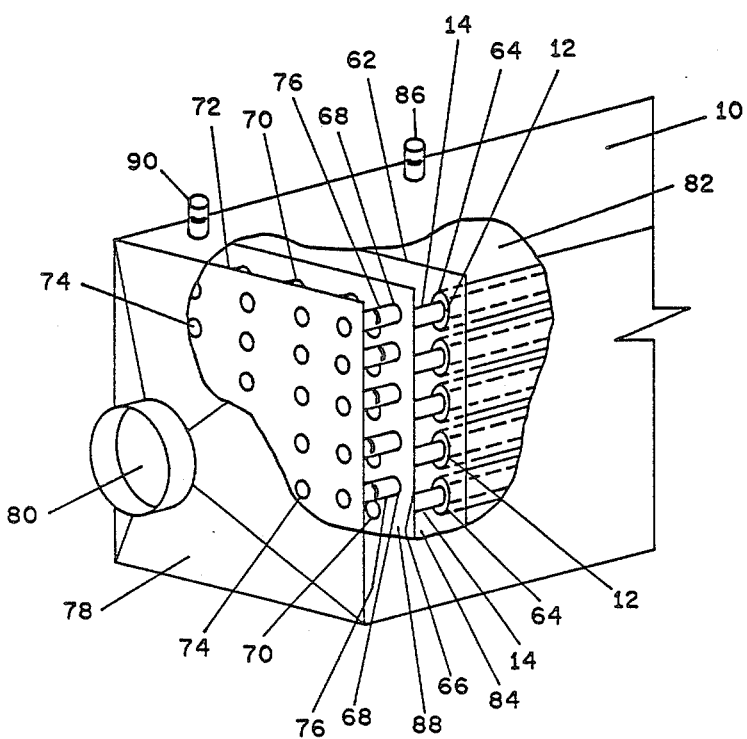
FIG. 2

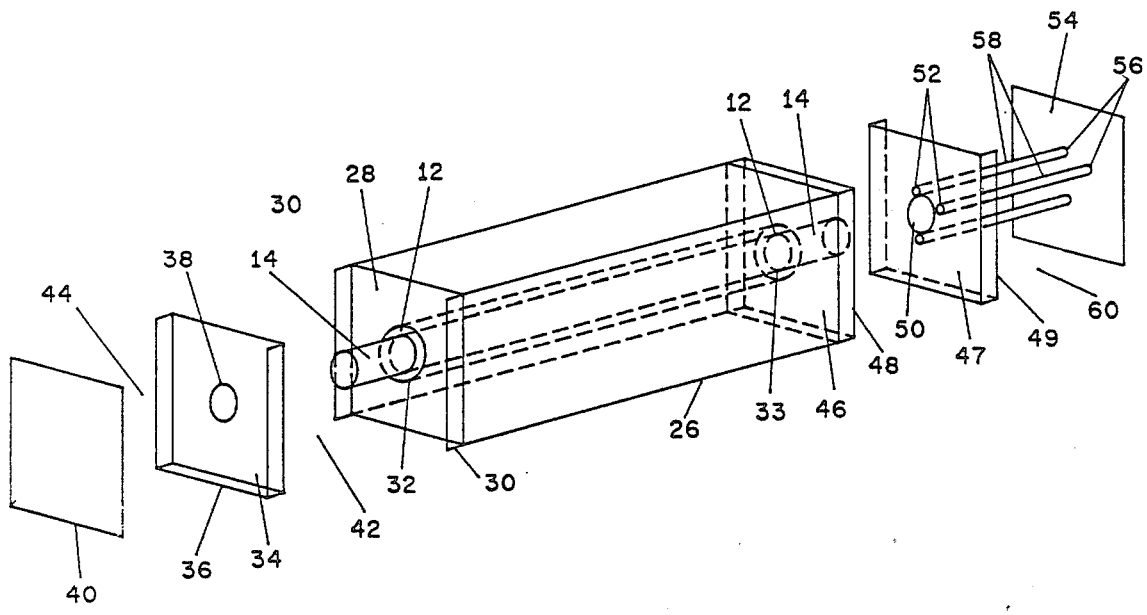
FIG. 3
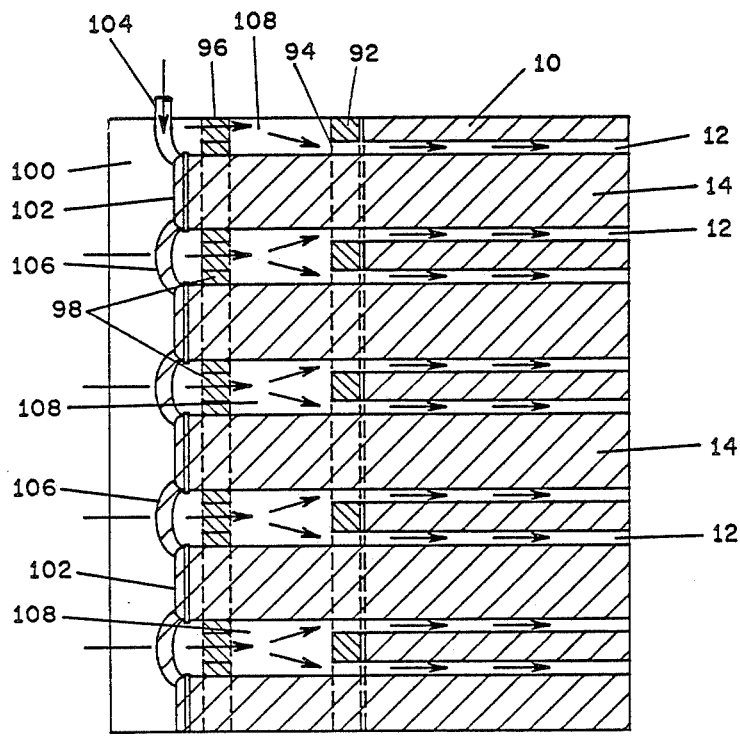
FIG. 4  ▨ ENERGY STORAGE MATERIAL

ZONE STORAGE HEAT EXCHANGER

BACKGROUND OF THE INVENTION

The present invention relates to a new apparatus and heat exchanger configuration useful in heating and cooling structures and generally in many heat transfer applications. More specifically, the present invention relates to a heat exchanger apparatus which functions both as a heat exchanger and a heat storage apparatus.

The most commonly used configuration (such as shell-tube heat exchangers) for heat transfer apparatus involving the use of an energy storage material is the apparatus shown in FIG. 1B with the heat exchanger conduits submerged in a zone filled with such a material. The arrangement of the tube in the actual exchanger might be a straight bank of tubes or a serpentine coil. This configuration has the disadvantage that the heat transfer surface area is limited unless a large number of tubes or finned-shaped tubes are used. Both of these options will increase the cost of the heat exchanger.

Another known configuration for energy storage material heat exchangers is that shown in FIG. 1C which is also described in U.S. Pat. No. 4,250,958 to Wasserman, issued Feb. 17, 1981. In this configuration, the storage material fills the annular space and the heat transfer fluid passes through the center of the conduit. This configuration suffers from the disadvantage that, although there is a large heat transfer capacity, the storage capacity is small.

The present invention has the following advantages:

1. It has a high heat transfer surface area to volume ratio which is accomplished by the zone storage configuration.

2. For the same heat transfer surface area, the device of the present invention has a significantly larger energy storage material storage capacity than conventional shell-tube heat exchangers and the other heat exchangers discussed above.

3. The device can be used with both gaseous and liquid heat transfer fluids.

4. There is a low pressure drop because of the use of straight tubes rather than spiral or serpentine coils.

5. Shipping and installation costs are reduced because the device can be filled with the storage material after installation. The unit can be manually handled without heavy equipment.

SUMMARY OF THE INVENTION

This invention is a zone storage heat exchanger. In its most basic terms, the heat exchanger is comprised of a main body filled with an energy storage material. There is disposed within the main body a heat transfer fluid annulus for flow of the heat transfer fluid therethrough. The annulus has a hollow inner portion which is filled with a storage material.

BRIEF DESCRIPTION OF THE DRAWINGS

FIG. 1A shows the configuration used in the heat exchanger of the present invention.

FIG. 1B shows the configuration for a conventional heat exchanger.

FIG. 1C shows the configuration used in the heat exchanger of the Wasserman patent.

FIG. 2 is a cut-away perspective view of a multiannular tube heat exchanger designed according to the present invention.

FIG. 3 is a blown-up perspective view of a single annular tube heat exchanger made according to the present invention and illustrating two different designs for flow of the heat exchange fluid into and out of the annulus.

FIG. 4 is a sectional view of the device of FIG. 2 modified to interconnect the energy storage material storage areas within the inner portion of the annular tubes.

DETAILED DESCRIPTION OF THE DRAWINGS

Figure 5:
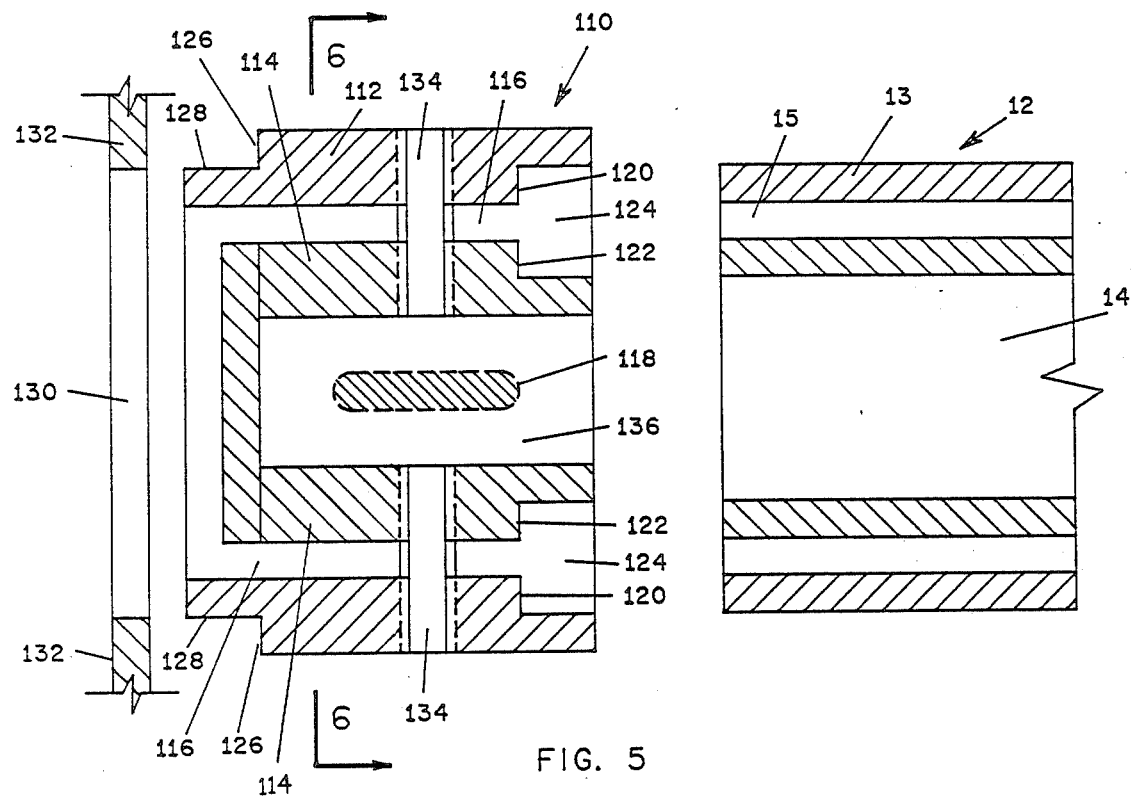
FIG. 5 is a sectional view of a transition section.

The configuration of the present invention is illustrated in FIG. 1A. There is shown a main body 10 which is filled with an energy storage material. Within main body 10 there is disposed an annulus 12 for passage of a heat transfer fluid therethrough. The inner portion 14 of the annulus 12 is also filled with a storage material.

A common heat exchanger configuration is shown in FIG. 1B wherein there is disposed a heat exchange fluid conduit 16 disposed within the main body 18 which is filled with a storage material. The other common configuration, as shown in the Wasserman patent, is illustrated in FIG. 1C wherein an annular tube 20 is provided. The annulus 22 is filled with a storage material and the inner portion 24 of the tube 20 is a conduit for heat transfer fluid.

The annular shape of the heat exchange fluid conduit of the present invention as shown in FIG. 1A is the key to the advantages of the invention. This allows maximum heat transfer surface area and a maximum amount of energy storage material to be present in the exchanger because the energy storage material is also within the inner portion 14 of the annulus 12. By contrast, in the configuration shown in FIG. 1B, the only way to match the energy storage capacity of the configuration of the present invention would be to use a smaller diameter heat transfer tube. This, of course, would decrease the heat transfer surface area of the device. The energy storage capacity or the efficiency of the heat exchanger will be much lower than that of the configuration of the present invention. On the other hand, the configuration shown in FIG. 1C should provide a highly efficient heat transfer capacity but the energy storage capacity of this configuration is much smaller than that of the present invention because of the smaller amount of energy storage material which can be incorporated into the device.

Table 1 shows the calculated storage capacities, heat transfer areas, and surface to volume ratios for the three configurations discussed above. The same exterior dimensions, width 12 inches × height 12 inches × length 1 inch, were used in all three cases. The cross-sectional area, which is 12 inches × 12 inches, was divided into 16 three-inch square heat transfer zones. It can be seen that the storage capacity of the device of the present invention is the same as that of the configuration shown in FIG. 1B but that the device of the present invention has a much higher heat transfer area and surface to volume ratio than the configuration of FIG. 1B. The heat transfer area of the configuration of FIG. 1C is the same as the heat transfer area of the device of the present invention and the surface to volume ratio is greatly increased. However, the storage capacity of FIG. 1C is much less than the storage capacity of the configuration of the present invention. If there is less storage capacity for the energy storage material, there is also less energy storage capacity.

TABLE 1

| Configuration | Storage Capacity (in.$^3$) | Heat Transfer Area (in.$^2$) | Surface-to Volume Ratio (ft.$^{-1}$) |
| --- | --- | --- | --- |
| A | 122 | 176 | 17.3 |
| B | 122 | 44 | 4.3 |
| C | 22 | 176 | 96 |

In the design of zone storage phase change heat exchangers according to the present invention, the relative diameters of the annulus, as well as the dimensions of the storage zone surrounding each individual annulus, are critical parameters. The magnitudes of these parameters are determined on the basis of a consideration of the selected material of construction of the heat exchanger, the type of heat exchanger fluid to be used, the heat exchanger fluid flow rate and temperature and, in the case of a phase change material zone storage heat exchanger, the thermal conductivity of the phase change material and the desired duration of the heat exchanger charge cycle and discharge cycle. Thus, the temperature of the PCM, within and outside the annulus, can be uniformly distributed during the charge and the discharge cycle.

The heat exchangers of the present application have many applications and can be used in several ways. They can be used as standard heat exchangers. They can be used to store heat energy in the winter. They also can be used to store "coolness" in the summer by having the energy storage material absorb heat energy from the heat transfer fluid.

The energy storage material can be a phase change material such as polyethylene glycol, other hydrocarbons, certain salt hydrates or water. The energy storage material can also simply be a material such as water which is capable of storing heat or "coolness" without going through a phase change.

FIG. 3 illustrates a heat exchanger which has an energy storage material container 26 which has an inner support section 28 at one end thereof. The inner support section 28 has two outwardly projecting flanges 30 at the sides thereof and has an opening 32 at the center of the section 28. There is an outer support section 34 mounted on the flanges 30. This section 34 has its own outwardly projecting flange 36 which extends around the sides and bottom of the section 34. Also, there is an opening 38 in section 34 which is aligned with the opening 32 of section 28. End plate 40 is mounted on the flange 36. The two sections form a heat transfer fluid chamber 42 between them, and the outer section 34 and the end plate 40 form an energy storage material chamber 44 between them.

The heat transfer fluid annulus 12 is disposed within the storage material container 26. The outer portion of the annulus 12 is in direct sealable contact with the inner support section 28 at the opening 32 therein. The opening 32 of the inner support section 28 is large enough to allow heat transfer fluid flow from the heat transfer fluid chamber 42 to the annulus 12. The inner portion 14 of the annulus 12 extends through inner support section 28 to the outer support section 34 at the opening 38 therein and is in direct sealable contact with the outer support section 34.

In operation, an energy storage material can be introduced into the storage material chamber 44 from whence it will flow into the inner portion 14 of the annulus 12. It can also be removed through the chamber 44. A heat transfer fluid may be introduced into the heat transfer fluid chamber 42 and it will then flow into the annulus 12 through the opening 32 in the inner support section 28. In operation, the storage material container 26 will be filled with energy storage material which will completely surround the annulus 12. If desired, the inner support section 28 may also be provided with a flange at the bottom thereof to facilitate the flow of the heat transfer fluid.

FIG. 3 also illustrates another method for heat transfer fluid flow between the exterior of the exchanger and the annulus 12. There is provided a support section 46 at one end of the phase change material container 26. This section 46 has an outwardly projecting flange 48 along the top, side and bottom portions thereof and has an opening 33 at the center of Section 46. There is an outer support section 47 mounted on flanges 48. This section 47 has its own outwardly projecting flange 49 which extends around the sides and bottom of the section 47. This section 47 also has a storage material opening 50 therein which is aligned with the openings 33 of section 46 and several heat transfer fluid openings 52. There is an end plate 54 mounted on the flange 49 which has heat transfer fluid openings 56 aligned with the heat transfer fluid openings 52 of the support section 47. Heat transfer fluid conduits 58 extend between the openings 50 and 56. The outer portion of the annulus 12 is in direct sealable contact with the support section 46 at the opening 33. The inner portion 14 of the annulus 12 extends to the opening 50 and is in direct sealable contact with the support section 47. The heat transfer fluid openings 52 are aligned such that they communicate with the annulus 12 to allow flow of the heat transfer fluid from the annulus 12 through the conduits 58 to the exterior of the heat exchanger. The storage material can be introduced into the storage material chamber 60 formed by the section 47 on the end plate 54. The storage material will flow from the chamber 60 into the inner portion 14 of the annulus 12. It is important to note that the heat transfer fluid conduit structure can be used at both ends of the heat exchanger if it is so desired and also the inner and outer support section embodiment can be used at both ends of the exchanger if that is desired.

FIG. 2 illustrates an embodiment of the present invention which utilizes a number of annular tubes. The main body 10 is filled with an energy storage material. At each end of the main body 10, there is a first section 62 which confines the storage material within the main body 10. The first section 62 has several heat transfer fluid openings 64 therein. Also within the main body 10 but outside of and adjacent to the first section 62 are second sections 66. The second sections 66 also have heat transfer fluid openings 68 therein and storage material openings 70 therein which are aligned with the openings 64 in the first section 62.

Third sections 72 are disposed at the end of the main body 10 outside of and adjacent to the second sections 66. The third sections 72 have heat transfer fluid openings 74 therein which are aligned with the heat transfer fluid openings 68 of the second section 66. Heat transfer fluid conduits 76 extend between the heat transfer fluid openings 66 and 74. At each end of the main body 10 is a manifold 78 which has a large heat transfer fluid opening 80 therein.

Disposed within the main body 10 are a number of heat transfer fluid annuluses 12 which have a hollow inner portion 14 for storage of an energy storage material. The outer portions of the annuluses 12 are in direct sealable contact with the first sections 62 to seal off a first storage material chamber 82 which is formed by the outer walls of the main body 10 and the first sections 62. The annuluses 12 come into contact with the first section 62 at the heat transfer fluid openings 64 thereof to allow a heat transfer fluid to flow from the annuluses 12 through the openings 64 into a heat transfer fluid chamber 84 which is formed between the first sections 62 and the second sections 66. The inner portions 14 of the annuluses 12 extend through the heat transfer fluid chamber 84 to the storage material openings 70 in the second sections 66 and are in direct sealable contact with the second sections 66 to prevent the heat transfer fluid from flowing through the openings 70.

The second section 66 and the third section 72 form a second storage material chamber 88. There is a fill port 90 for the second storage material chamber 88 and also a fill port 86 for the main body 10. A storage material is introduced into chamber 82 in the main body 10 through the main body fill port 86. All of the annuluses 12 will be completely surrounded by the storage material. The storage material is introduced into chambers 88 through fill port 90. The storage material will flow from chamber 88 into the inner portions 14 of the annuluses 12 such that they are filled with storage material.

In operation, heat transfer fluid will flow into the exchanger through the opening 80 in the manifold 78 and then through openings 74 in the third sections 72 through the conduits 76 into the heat transfer fluid chambers 84 and from there into the annuluses 12.

FIG. 4 illustrates a device which is similar to that of FIG. 2 but which has a different means for introducing the phase change material into the inner portions 14 of the annuluses 12. This means eliminates the necessity of the third section 72 and also eliminates the need for the heat transfer fluid conduits 76. FIG. 4 shows a number of annuluses 12 within a main body 10. The outer portion of the annuluses 12 are in direct sealable contact with a first section 92 which has an opening 94 therein for passage of a heat transfer fluid therethrough into the annulus 12. Located adjacent to and outside of the first sections 92 are second sections 96 which have openings 98 therein for passage of a heat transfer fluid therethrough. The inner portions 14 of the annuluses 12 extend through the openings 94 and 98 into the manifold 100, at which end they are closed off by end caps 102. Fill port 104 allows the introduction of a storage material into the inner portions 14 of annuluses 12. The annuluses 12 are interconnected by storage material tubes 106 such that all can be filled by introducing a storage material into the fill port 104 which is directly in communication with the inner portions 14 of annuluses 12.

In operation, the heat transfer fluid flows from the manifold 100 through the openings 98 into the heat transfer fluid chamber 108 defined by the first section 92 and the second section 96 through the openings 94 into the annulus 12.

Figure 6:
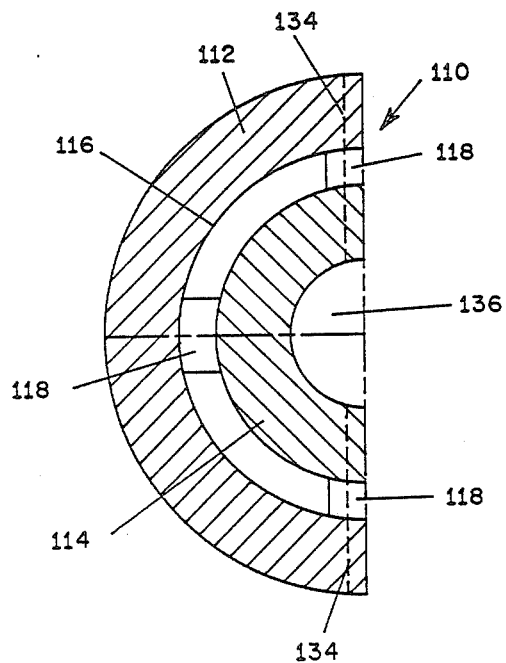
FIG. 6 is a sectional view taken along lines 6 of FIG. 5 and further illustrating the transition section.

FIGS. 5 and 6 illustrate an embodiment of the invention wherein a transition section 110 is utilized in place of the first sections shown in FIGS. 2 and 4. The transition section 110 is comprised of a hollow outer support ring 112 and a hollow inner support ring 114 which define or form an annular heat transfer fluid passage 116 through the transition section 110. Support spacers 118 are provided to keep the rings apart. The rings are notched at 120 and 122 such that the annulus 12 fits into the enlarged space 124 between the rings. This provides direct sealable contact between the outer support ring 112 and the outer portion 13 of the annulus 12 while still maintaining a passage 15 for fluid flow from the annulus 12 into the transition section heat transfer fluid passage 116.

At the other end of the transition section 110, the outer ring 112 is notched at 126 on the outside thereof to provide a reduced diameter portion 128 which fits snuggly inside the opening 130 in the end plate 132. The communication between the end plate 132 and the notched portion 126 provides a seal between the end plate 132 and the transition section 110. Thus, heat transfer fluid can flow from the exterior of the exchanger through opening 130 in the end plate 132 and the passage 116 into the annulus 12.

The transition section 110 is provided with fill ports 134 which extend through the outer support ring 112 and the inner support ring 114 into the hollow interior (storage material chamber) 136 of the inner support ring 114. The inner support ring 114 is open at the end which is in communication with the inner portion 14 of the annulus 12 but is closed at the other end. Thus, a storage material may be introduced through the fill port 134 and will flow into the chamber 136 to the interior portion 14 of the annulus 12.

One of the advantages of the present invention is that it allows the achievement of a uniform temperature distribution throughout the unit. This is important because it is indicative of optimum heat transfer. The temperature distribution in a storage heat exchanger indicates the heat propagation with time in all directions. If the temperature distribution is not even, the energy storage material in some parts of the heat exchanger will change phase at different times than that in other parts. This will extend the period of time required to charge or discharge the unit and thereby reduce its overall efficiency.

Seven thermocouples were installed in the zone storage heat exchanger test model as shown in FIG. 3. Six of them were emerged in the storage medium in two rows and each at different heights. The seventh thermocouple was inserted in an inner tube of a central row single unit.

The experimental procedures of the test are based on the standard procedures specified in ASHRAE Standard 94-77. Constant temperature air entered the test unit to charge or discharge the storage medium in the test unit. The volumetric flow rate of the air was also maintained constant during both charge and discharge half cycle except the value may have varied somewhat between the charge cycle and discharge cycle. During the charge cycle, low temperature air, e.g. 40°-50° F., was used to charge the storage medium, i.e. to solidify the medium. Room temperature air, e.g. 78° to 80° F., was used to discharge the coolness from the storage medium, i.e. to melt the medium.

Table 2 presents the test results that are the temperature readings of all seven thermocouples at different test times. It can be seen that the differences between all thermocouples are very small which is indicative of good heat transfer performance.

TABLE 2

Temperature Distribution Within the Zone Storage Heat Exchanger

| Time (hrs.) | #1 | #2 | #3 | #4 | #5 | #6 | #7 | Cycle |
|---|---|---|---|---|---|---|---|---|
| 0 | 83 | 83 | 82 | 82 | 82 | 83 | 82 | charge |
| 1.9 | 83 | 82 | 82 | 82 | 82 | 82 | 82 | " |
| 2.5 | 71 | 70 | 69 | 68 | 70 | 72 | 66 | " |
| 3.0 | 61 | 59 | 58 | 57 | 59 | 61 | 53 | " |
| 3.5 | 56 | 54 | 52 | 52 | 53 | 56 | 49 | " |
| 4.0 | 48 | 46 | 45 | 45 | 46 | 48 | 45 | " |
| 4.5 | 46 | 44 | 44 | 44 | 44 | 46 | 44 | " |
| 5.0 | 47 | 46 | 46 | 47 | 45 | 47 | 45 | discharge |
| 5.5 | 47 | 46 | 47 | 48 | 46 | 47 | 45 | " |
| 6.0 | 46 | 46 | 46 | 47 | 46 | 46 | 44 | " |
| 6.5 | 46 | 46 | 46 | 46 | 46 | 46 | 43 | " |
| 7.0 | 46 | 46 | 46 | 46 | 45 | 47 | 43 | " |
| 7.5 | 47 | 45 | 46 | 46 | 45 | 47 | 44 | " |
| 8.0 | 50 | 51 | 50 | 50 | 50 | 51 | 52 | " |
| 8.5 | 53 | 55 | 53 | 52 | 53 | 60 | 59 | " |
| 9.0 | 59 | 68 | 64 | 58 | 66 | 72 | 73 | " |
| 9.5 | 77 | 73 | 68 | 61 | 71 | 75 | 78 | " |

We claim:

1. A zone storage heat exchanger which comprises:
   (a) a main body having a first energy storage material chamber including means for filling the first energy storage material chamber with an energy storage material,
   (b) an end plate at each end of the main body to contain the phase change material within the first energy storage material chamber, said end plates having an opening therein,
   (c) at least one transition section at each end of the main body and comprised of inner and outer hollow concentric support rings, said outer ring being open at each end and positioned in direct sealable contact with the end plate at the opening therein to prevent flow of an energy storage material from the first energy storage material chamber through the end plate while allowing flow of a heat transfer fluid therethrough and said inner ring being open at one end and closed at the other end to define a second energy storage material chamber within the inner ring, said rings defining therebetween an annular passage for flow of a heat transfer fluid through the transition section, said transition section having at least one energy storage material fill tube extending through the rings to the second energy storage material section, and
   (d) at least one heat transfer fluid annulus disposed within the first energy storage material chamber and having a hollow inner portion wherein the outer portion of the annulus is in direct sealable contact with the transition section to seal off the first energy storage material chamber while allowing a heat transfer fluid to flow from the annulus into the heat transfer fluid passage in the transition section and wherein the inner portion of the annulus is in direct sealable contact with the inner ring of the transition section while allowing an energy storage material to flow between the inner portion of the annulus and the second energy storage material chamber.

2. The zone storage heat exchanger of claim 1 wherein there is a manifold at each end of the exchanger, which has an opening therein for flow of a heat transfer fluid.

3. The zone storage heat exchanger of claim 1 wherein the inner portion of the annulus and the first and second energy storage material chambers are filled with an energy storage material.

* * * * *